United States Patent
Zhang et al.

(10) Patent No.: US 12,149,729 B2
(45) Date of Patent: Nov. 19, 2024

(54) SELECTIVE TEMPLATE MATCHING IN VIDEO CODING

(71) Applicant: HULU, LLC, Santa Monica, CA (US)

(72) Inventors: Wenhao Zhang, Beijing (CN); Deliang Fu, Beijing (CN); Chen Liu, Beijing (CN); Xiaobo Liu, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 18/597,907

(22) Filed: Mar. 6, 2024

(65) Prior Publication Data

US 2024/0214601 A1    Jun. 27, 2024

Related U.S. Application Data

(62) Division of application No. 16/556,015, filed on Aug. 29, 2019, now Pat. No. 11,956,460.

(60) Provisional application No. 62/726,125, filed on Aug. 31, 2018.

(51) Int. Cl.
| | | |
|---|---|---|
| *H04N 19/513* | (2014.01) | |
| *H04N 19/105* | (2014.01) | |
| *H04N 19/176* | (2014.01) | |
| *H04N 19/182* | (2014.01) | |

(52) U.S. Cl.
CPC ......... *H04N 19/513* (2014.11); *H04N 19/105* (2014.11); *H04N 19/176* (2014.11); *H04N 19/182* (2014.11)

(58) Field of Classification Search
CPC .. H04N 19/513; H04N 19/176; H04N 19/182; H04N 19/105
See application file for complete search history.

(56) References Cited

U.S. PATENT DOCUMENTS

| | | |
|---|---|---|
| 9,025,893 B2 | 5/2015 | Lee et al. |
| 9,432,692 B2 | 8/2016 | Lin et al. |
| 9,544,596 B1 | 1/2017 | Han et al. |
| 2009/0116760 A1 | 5/2009 | Boon et al. |
| 2011/0002388 A1 | 1/2011 | Karczewicz et al. |
| 2011/0176741 A1 | 7/2011 | Sato et al. |

(Continued)

FOREIGN PATENT DOCUMENTS

| | | |
|---|---|---|
| CN | 102474622 A | 5/2012 |
| CN | 112534809 A | 3/2021 |

(Continued)

OTHER PUBLICATIONS

Chinese Office Action for CN Application No. 2019800518469, dated Sep. 22, 2023, 11 pages. English Translation attached.

(Continued)

*Primary Examiner* — Shawn S An
(74) *Attorney, Agent, or Firm* — Kwan & Olynick LLP

(57) ABSTRACT

In some embodiments, a method selects a first template of pixels that is outside of a first block and a second template of pixels that is outside of the first block. Then, the method selects a first region of pixels that are inside the first block and a second region of pixels that are inside the first block. A first weight is calculated based on the first template of pixels and the first region of pixels and a second weight is calculated based on the second template of pixels and the second region of pixels. The first weight and the second weight are used in a motion prediction search for a second block.

20 Claims, 11 Drawing Sheets

(56) References Cited

U.S. PATENT DOCUMENTS

| | | |
|---|---|---|
| 2014/0003522 A1 | 1/2014 | Park et al. |
| 2014/0348241 A1* | 11/2014 | Lim .................. H04N 19/13 375/240.16 |
| 2015/0304656 A1 | 10/2015 | Guillemot et al. |
| 2017/0180727 A1 | 6/2017 | Huang et al. |
| 2017/0318311 A1 | 11/2017 | Said et al. |
| 2017/0332075 A1* | 11/2017 | Karczewicz .......... H04N 19/70 |
| 2017/0353719 A1 | 12/2017 | Liu et al. |
| 2018/0098086 A1 | 4/2018 | Chuang et al. |
| 2018/0146192 A1 | 5/2018 | Tao et al. |
| 2019/0020895 A1 | 1/2019 | Liu et al. |
| 2019/0215531 A1 | 7/2019 | Lee et al. |
| 2020/0029076 A1 | 1/2020 | Sharman et al. |

FOREIGN PATENT DOCUMENTS

| | | |
|---|---|---|
| EP | 3809701 A1 | 4/2021 |
| EP | 3844954 A1 | 7/2021 |
| WO | 2017142326 A1 | 8/2017 |
| WO | 2017203203 A1 | 11/2017 |

OTHER PUBLICATIONS

Chinese Search Report for CN Application No. 2019800518469, dated Sep. 19, 2023, 2 pages.
European Application Serial No. 19854908.1, Search Report mailed May 27, 2022, 13 pgs.
International Search Report and Written Opinion for International Application No. PCT/US2019/049235 (000118-027102WO) dated Dec. 30, 2019, 12 pages.

* cited by examiner

SELECTIVE TEMPLATE MATCHING IN VIDEO CODING

CROSS REFERENCE TO RELATED APPLICATIONS

This application is a divisional application and, pursuant to 35 U.S.C. § 120, is entitled to and claims the benefit of earlier filed application U.S. application Ser. No. 16/556,015, filed Aug. 29, 2019, entitled "SELECTIVE TEMPLATE MATCHING IN VIDEO CODING", which is entitled to and claims the benefit of the filing date of U.S. Provisional App. No. 62/726,125 filed Aug. 31, 2018, the content of which is incorporated herein by reference in its entirety for all purposes.

BACKGROUND

In a video coding framework, video content is compressed via a set of processes: prediction, transformation, quantization, and entropy coding. Inter prediction is a type of prediction in which the temporal redundancy between adjacent video frames is reduced. Inter prediction first determines a template from neighboring blocks to a current block that is currently being coded (e.g., encoded or decoded). Then, a video transcoder or decoder uses the template to find the best matching area inside a search region of a reference frame. In the search, the video transcoder or decoder determines a motion vector to a reference block associated with the matching template area. In some cases, the neighboring template region may not be similar to the content in the current block. In this case, when a matching template area is found, the reference block may not be the best match to the current block being coded. Then, the matching template search process may generate sub-optimal results when the neighboring template region has less similarity to the coding block.

BRIEF DESCRIPTION OF THE DRAWINGS

FIG. 3 depicts cases of finding matching templates in which neighboring blocks are not similar.

DETAILED DESCRIPTION

Described herein are techniques for a video coding system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

During motion prediction, a transcoder or decoder may determine a rough reference block for a current block. The transcoder or decoder uses the rough reference block to perform motion prediction to find a final reference block. To determine the final reference block, the transcoder or decoder may use template regions, which are neighboring areas to the current block and the rough reference block. Sometimes, the template regions may not optimal, such as the template regions may not be similar in content to the current block or the rough reference block, such as when the rough reference block or current block are within an object and the template regions are not within the object. The use of template regions that are not optimal may result in less efficient compression of the encoded bitstream. Some embodiments can detect the reliability of template regions and lessen the effect of regions that are less similar to the current coding block being coded during a motion prediction search. The motion prediction search accuracy of template matching is improved, and the resulting compression performance of the video codec is increased.

System

Figure 1:
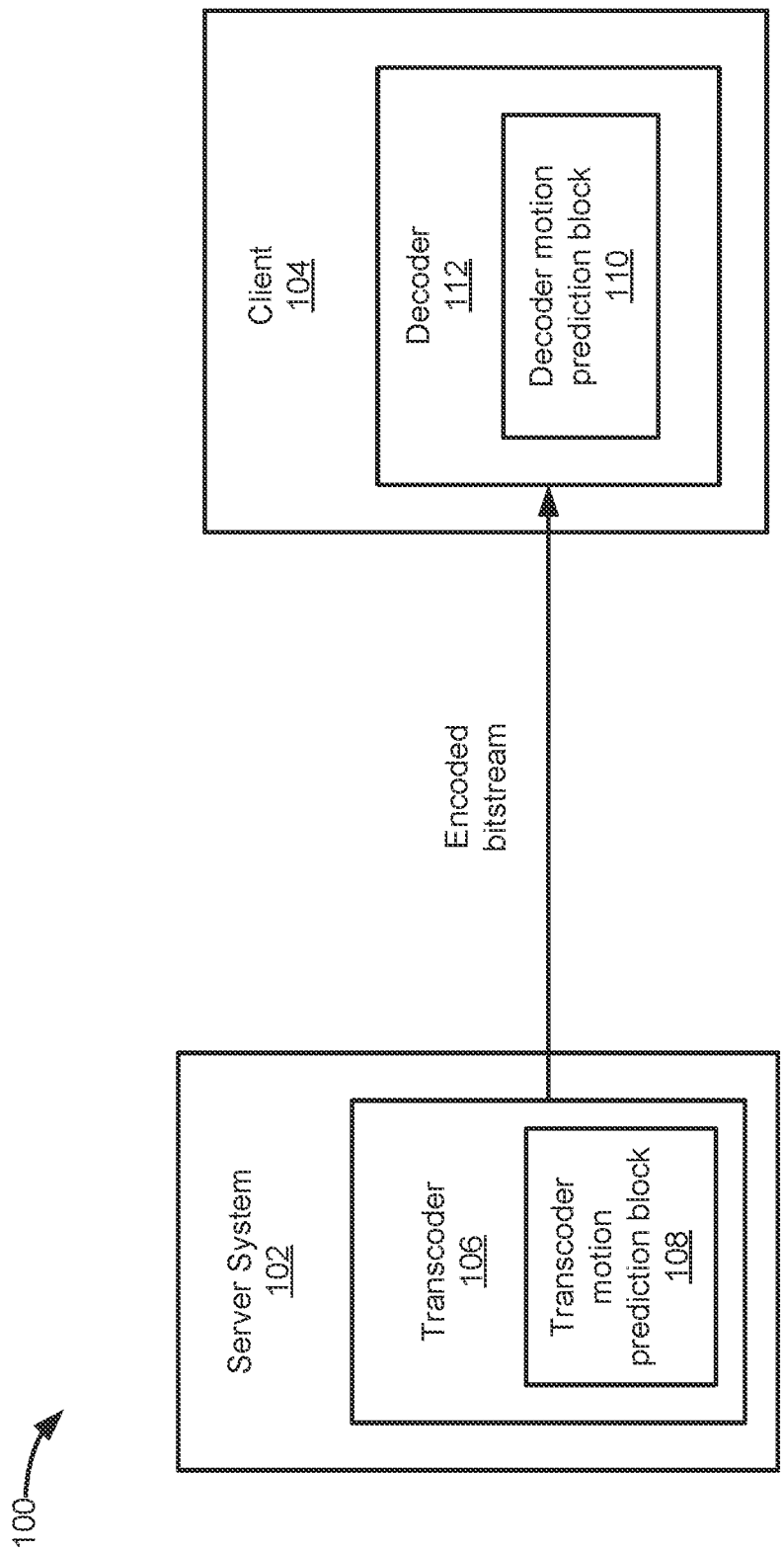
FIG. 1 depicts a simplified system for performing motion prediction according to some embodiments.

FIG. 1 depicts a simplified system 100 for performing motion prediction according to some embodiments. System 100 transcodes a source video asset, which may be any type of video, such as for a television show, movie, or video clip. The source video may need to be transcoded into one or more formats, such as formats having one or more bitrates. In some embodiments, a server system 102 sends an encoded bitstream to client 104. For example, server system 102 may be sending a video to a client 104 for playback.

Server system 102 includes a transcoder 106 that transcodes a video into an encoded bitstream. Transcoder 106 may be a software video processor/transcoder configured on a central processing unit (CPU), a hardware accelerated video processor/transcoder with a graphical processing unit (GPU), a field programmable gate array (FPGA), and/or a hardware processor/transcoder implemented in an application-specific integrated circuit (ASIC). Transcoding may be the conversion from one digital format to another digital format. Transcoding may involve decoding the source format and encoding the source video into another digital format, or converting the source content into videos with a specific resolution, framerate, bitrate, codec, etc. Also, encoding may be the conversion of analog source content and to a digital format. As used, the term transcoding may include encoding.

During the transcoding process, a transcoder motion prediction block 108 performs motion prediction for a current block of a current frame. During motion prediction, transcoder motion prediction block 108 may perform a template search process, which will be described in more detail below.

Transcoder 106 transmits the resulting encoded bitstream to decoder 112 over a network or other types of medium. Decoder 112 receives the encoded bitstream and a decoder motion prediction block 110 performs motion prediction during the decoding process. During motion prediction, decoder motion prediction block 110 may perform a template search process, which will be described in more detail below.

The template search process in transcoder motion prediction block 108 and/or decoder motion prediction block 110 may be optimized by adjusting the weights that are applied to template regions. Transcoder motion prediction block 108 and/or decoder motion prediction block 110 use weighted template regions to determine a final reference block to the current block.

In some embodiments, the template search by transcoder motion prediction block 108 and decoder motion prediction block 110 uses fewer bits in the encoded bitstream. A rough motion vector may be signaled in the encoded bitstream and then both transcoder motion prediction block 108 and decoder motion prediction block 110 determine a final motion vector to a final reference block. Transcoder motion prediction block 108 determines the residual between the current block and the final reference block and signals the residual in the encoded bitstream. Once receiving the rough motion vector, decoder motion prediction block 110 searches for the final motion vectors and arrives at the same final motion vector as transcoder motion prediction block 108. Decoder motion prediction block 110 can then apply the residual to the final reference block to decode the current block.

A motion vector may be a two-dimensional position offset between a current block and a reference block. A decimal precision motion vector may be used, such as (10.25, 4.5). A motion search searches for these finer granularity positions and finds the best reference block, which is the block most similar to the current block. Signaling these motion vectors requires a number of bits to represent both horizontal and vertical components in both integer and decimal digits.

In a template matched based motion refine scheme, a rough motion vector is a low precision motion vector, for example, it could be an integer-only motion vector, or more aggressively, a multiple of values, such as 2, 4, etc. Signaling this rough motion vector such as by signaling (10, 4) spends fewer bits. Then transcoder motion prediction block 108 and decoder motion prediction block 110 can start from the rough motion vector to derive the final motion vector by themselves without any further signaling on the final motion vector.

In some embodiments, the rough motion vector could be a copy of a motion vector from the existing neighboring blocks, or a global motion vector. The rough motion vector could be signaled by an index flag or an index in the encoded bitstream, which is done with fewer bits compared with signaling motion vectors. Decoder motion prediction block 110 can also be applied on these rough motion vectors to generate the final motion vectors for the current coding block.

Matching Template Search Process

Figure 2:
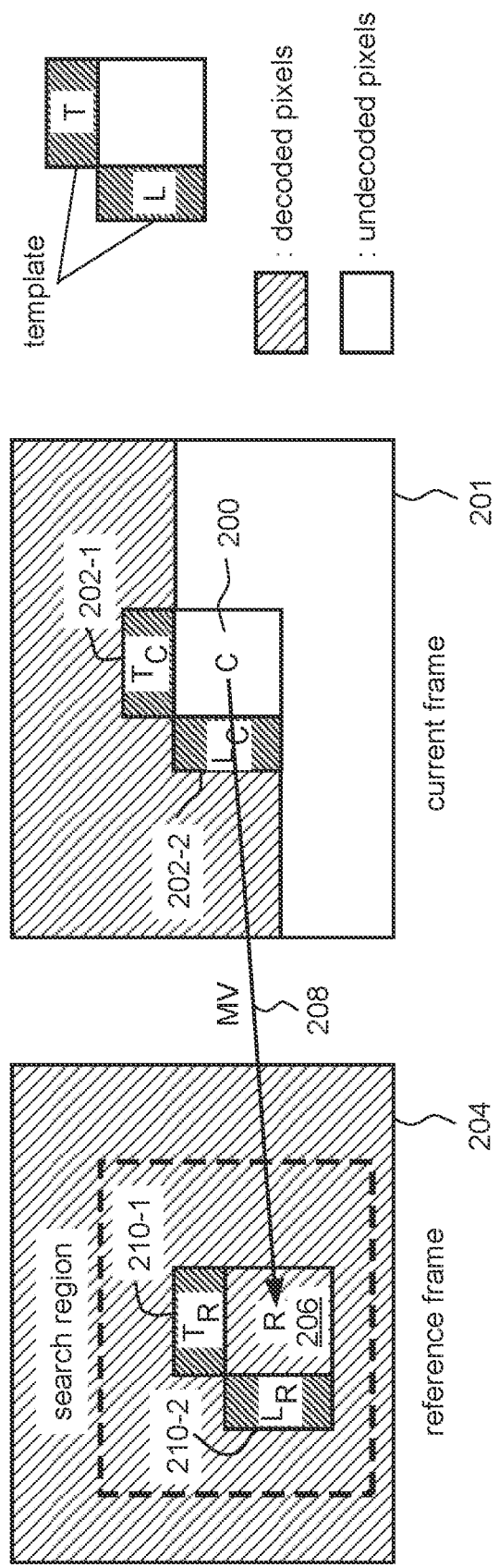
FIG. 2 depicts a template matching search process for inter prediction according to some embodiments.

FIG. 2 depicts a template matching search process for inter prediction according to some embodiments. The template matching search process may be performed by a codec (e.g., a module in transcoder 106 and/or decoder 112) that is transcoding a video into an encoded bitstream or decoding the encoded bitstream. The process may be referred to as decoder side motion derivation; however, although the process is referred to as decoder side motion derivation, transcoder motion prediction block 108 of transcoder 106 and decoder motion prediction block 110 of decoder 112 may both perform the described motion template search process.

The following will describe a matching template search process in general for background. Given a current coding block C 200 that is being transcoded in a current frame 201, transcoder motion prediction block 108 determines a template from neighboring decoded pixels. The template may include neighboring pixels to current block 200, such as the top neighboring pixels 202-1 and the left neighboring decoded pixels 202-2 from the current coding block. The top neighboring pixels include pixels that are on top of the current block and the left neighboring decoded pixels include pixels that are to the left of the current block. Although these positions are described, other positions may be appreciated. Also, although two template regions are described, more than two template regions may be used. The pixels in top neighboring pixels 202-1 and the left neighboring decoded pixels 202-2 have been transcoded and then decoded.

Transcoder motion prediction block 108 uses top neighboring pixels 202-1 and the left neighboring decoded pixels 202-2 to find a template inside a search region of a reference frame 204 that is similar to top neighboring pixels 202-1 and the left neighboring decoded pixels 202-2. The template area includes pixels that neighbor a rough reference block R 206, such as top neighboring pixels 210-1 and the left neighboring decoded pixels 210-2. Then, transcoder motion prediction block 108 determines the rough motion vector (MV) 208 of current block C that points to a rough reference block R 206 based on the template matching results. The search region may be based on a rough motion vector. Transcoder motion prediction block 108 can send information identifying rough motion vector 208 in the encoded bitstream to decoder 112.

Decoder 112 receives the encoded bitstream and then decodes the bitstream. During the decoding process, decoder motion prediction block 110 determines the rough motion vector and identifies the template for a rough reference block R 206. However, decoder motion prediction block 110 may also search for a block that provides a better match to current block C 200 compared to rough reference block R 206. In this case, decoder motion prediction block 110 performs a search to find a final motion vector to a final reference block inside a search region of reference frame 204, which will be described in more detail below. If decoder 112 determines a final reference block R 206, decoder 112 decodes the current block using the final reference block R and a residual from the encoded bitstream. For example, decoder 112 may combine the residual with final reference block R to generate the pixels for the current block C. Accordingly, both transcoder motion prediction block 108 and decoder motion prediction block 110 perform the same search for the final motion vector after determining the rough motion vector to arrive at the same final reference block.

To determine a final reference block that is considered to have a better similarity (e.g., an optimal similarity in the search region) to current block C 200, transcoder motion prediction block 108 or decoder motion prediction block 110 may calculate a similarity of a reference block to current block C 200. For example, transcoder motion prediction block 108 or decoder motion prediction block 110 may use a function, such a cost function, to calculate the similarity during the motion search for the final reference block. In some embodiments, the cost function may be:

$$R = \text{argmin Cost}(C, R), \text{ where Cost}(C, R) = \text{Dist}(T_C, T_R) + \text{Dist}(L_C, L_R),$$

where Dist(X, Y) is a measurement of similarity between two given blocks, e.g., block X and block Y, $T_C$ is a top template 202-1 for the current block C, $T_R$ is a top template $T_R$ 210-1 for a rough reference block R, $L_C$ is a left template 202-2 for the current block C, and $L_R$ is a left template $L_R$ 210-2 for a rough reference block R. The distance may be between corresponding pixel values in the template for current block C 200 and the template for a prospective final reference block. In some embodiments, the similarity is a distance, which may be measured by a Sum of Absolute Distortion (SAD), a Sum of Square Distortion (SSD), etc.

Figure 3:
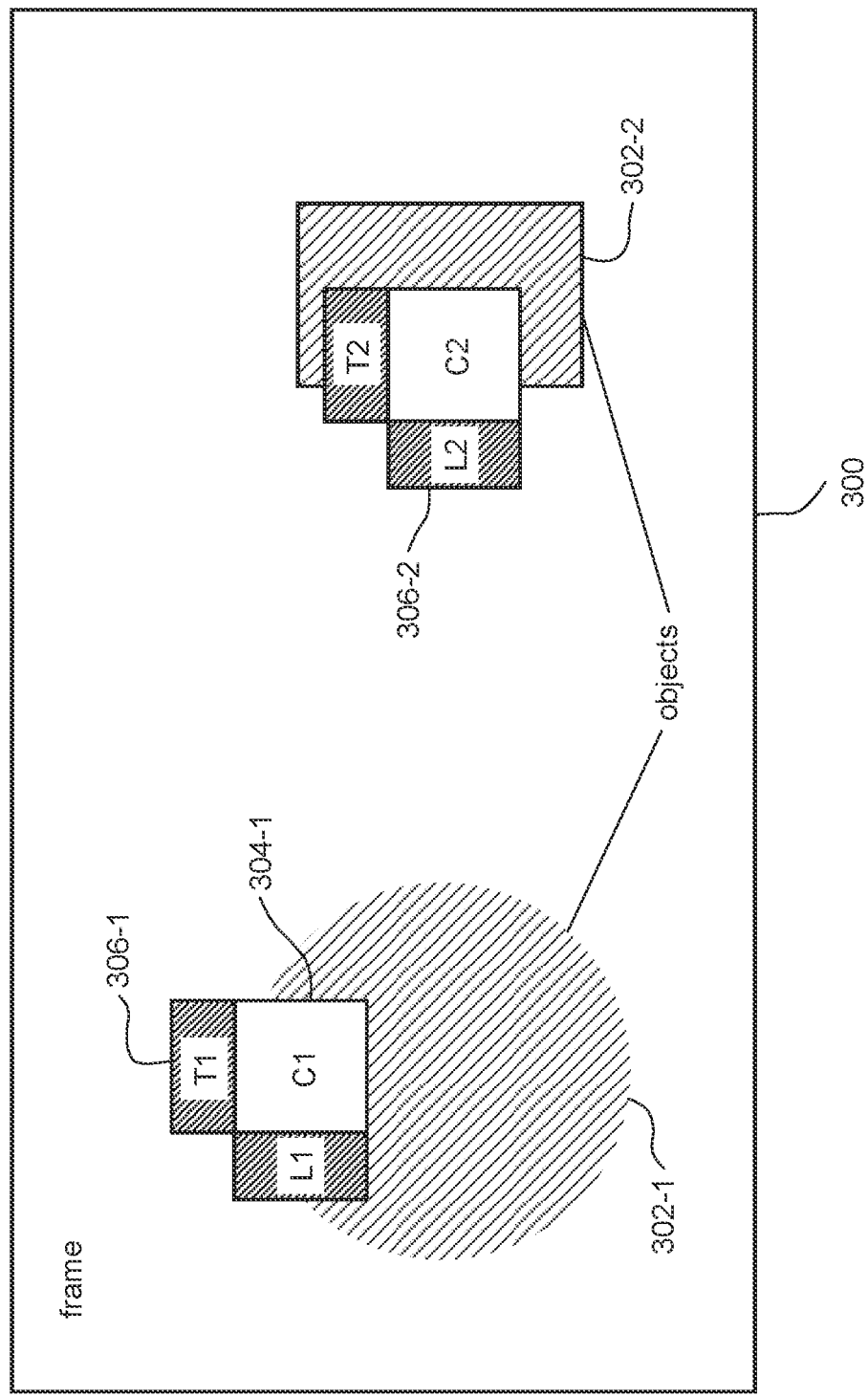

In a conventional design of the matching template search process on the decoder side, the left template and top template equally contribute to similarity in the cost function. However, it is possible that the left or top neighbors are not similar to the current block. FIG. 3 depicts cases of finding matching templates in which neighboring blocks are not similar. A frame 300 includes a first object 302-1 and a second object 302-2, which may be objects in the video.

A current block C1 304-1 is in first object 302-1. That is, current block C1 304-1 includes content for first object 302-1. For current block C1 304-1, template T1 306-1 is not in first object 302-1 which includes current block C1 304-1, and thus using template T1 306-1 may introduce inaccuracies in cost. That is, template T1 306-1 may include content that may be largely different from current block C1 304-1 because it is expected that the content in object 302-1 may be more similar than content outside of first object 302-1.

A current block C2 304-2 is in second object 302-2. That is, current block C2 304-2 includes content for second object 302-2. Similarly, for current block C2 304-2, template L2 306-2 is not in second object 302-2, which includes current block C2 304-2. Thus, using template L2 306-2 may also introduce inaccuracies in cost.

The above inaccuracies occur because when a matching template to template T1 or L2 is found, the associated final reference block may not be similar to the current block C1 or C2, respectively. Under these cases, the template matching motion prediction results may not be accurate, which may result in compression performance loss. However, if the template T1 or the template L2 was in the same object as the current block, then it is more likely that the final reference block is more similar to the current block because the matching template search process is looking for a template for a final reference block that includes similar content to the current block.

Accordingly, instead of using a fixed cost function, some embodiments may adjust the contribution of selected template regions. For example, transcoder motion prediction block 108 or decoder motion prediction block 110 may selectively prioritize template regions for a block based on a similarity measurement. In some embodiments, transcoder motion prediction block 108 or decoder motion prediction block 110 may assign different weighting factors to the template regions, such as the left template and the top template, when calculating the similarity using the cost function. For example, transcoder motion prediction block 108 or decoder motion prediction block 110 may use the following cost function:

$$R = \text{argmin Cost}(C, R),$$

$$\text{where Cost}(C, R) = W_T \cdot \text{Dist}(T_C, T_R) + W_L \cdot \text{Dist}(L_C, L_R),$$

where a weighting factor $W_T$ and a weighting factor $W_L$ reflect a weighting to adjust a contribution of the top template and the left template, respectively, to the cost. The term argmin calculates the smallest cost for the cost function of Cost(C, R), where C is the current block C, and R is the rough reference block R. The argmin function, given the current block C, searches for a reference block R that can generate a minimum cost. The cost of a current block C and a rough reference block R is based on a first weighting factor $W_T$ of the distance between a top template $T_C$ of the current block and a top template $T_R$ of the rough reference block. Also, the cost of current block C 200 and a rough reference block R is based on a second weighting factor $W_L$ of the distance between a left template $L_C$ of current block C 200 and a left template $L_R$ of the rough reference block. If one of the left or top template has a stronger similarity with current block C 200, some embodiments may generate the corresponding weighting factor to be larger.

Transcoder motion prediction block 108 or decoder motion prediction block 110 may use different methods to determine the weighting factors. In a first option #1, transcoder motion prediction block 108 derives the weighting factors, and sends the weighting factors to decoder motion prediction block 110. Then, decoder motion prediction block 110 uses the weighting factors in the matching template search process. In a second option #2, decoder motion prediction block 110 derives the weighting factors itself.

First Option #1 of Determining the Weighting Factors

Figure 4:
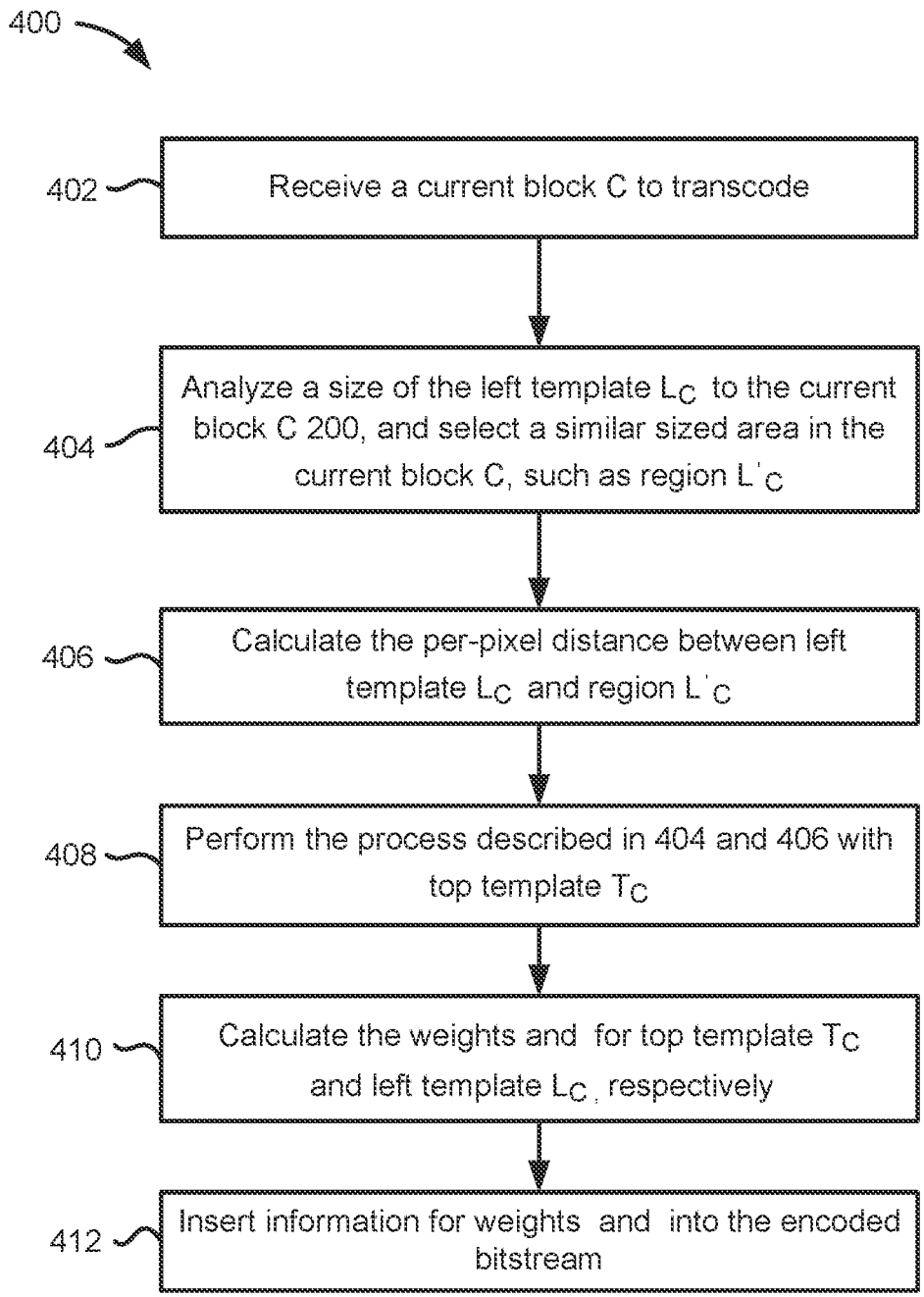
FIG. 4 depicts a simplified flowchart of a method for performing the matching template search process for a first option #1 according to some embodiments.
Figure 5A:
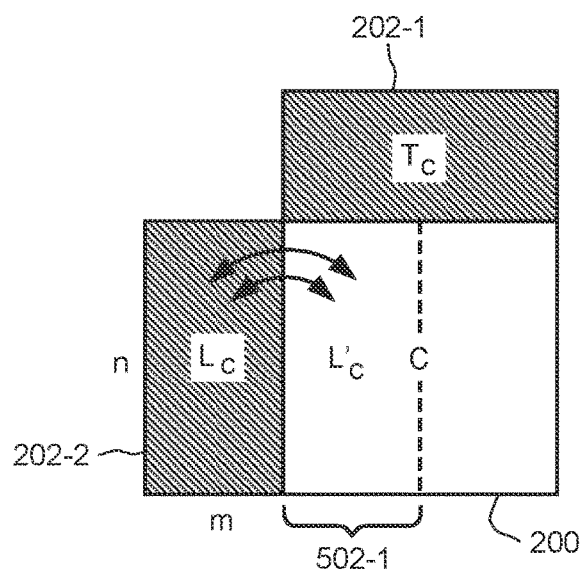
FIGS. 5A and 5B depict examples of a current block C to illustrate the matching template search process according to some embodiments.

FIG. 4 depicts a simplified flowchart 400 of a method for performing the matching template search process for first option #1 according to some embodiments. Also, the method will be described with respect to FIGS. 5A and 5B, which depict examples of a current block C 200 to illustrate the matching template search process according to some embodiments. At 402, at the transcoder side, transcoder motion prediction block 108 receives a current block C 200 to transcode. At 404 and in FIG. 5A, transcoder motion prediction block 108 analyzes a size of the left template $L_C$ 202-2 to the current block C 200, and selects a similar sized area in the current block C, such as region L'c 502. For example, transcoder motion prediction block 108 determines the size of left template $L_C$ 202-2 by measuring a height n and a width m. Then, transcoder motion prediction block 108 determines a similar size block in current block C 200. Although a neighboring region to left template $L_C$ 202-2 is selected, other regions could be used in different areas of current block C 200.

Then, at 406, transcoder motion prediction block 108 calculates the per-pixel distance between left template $L_C$ 202-2 and region L'c 502-1. In some embodiments, transcoder motion prediction block 108 may use the following to determine the distance, but other calculations may be appreciated:

$$\text{Dist}(L_c, L'_C) = \frac{\Sigma \|L_c(i, j) - L'_c(i, m - j)\|}{m \times n},$$

where (i, j) are pixel coordinates in left template $L_C$ 202-2, and (i, m-j) are corresponding pixel coordinates in region $L_C$ 502-1. The calculation takes the difference of pixel values between the left template $L_C$ 202-2 and region L'c 502-1 and divides the sum by the area of left template $L_C$ 202-2. This compares the difference between pixels in the same position in left template $L_C$ 202-2 and region $L'_C$ 502-1. Other methods to calculate a difference between pixel values between region L'c 502-1 and region L'c 502-1 may be appreciated, such as comparing an average of total pixel values between left template $L_C$ 202-2 and region L'c 502-1.

Figure 5B:
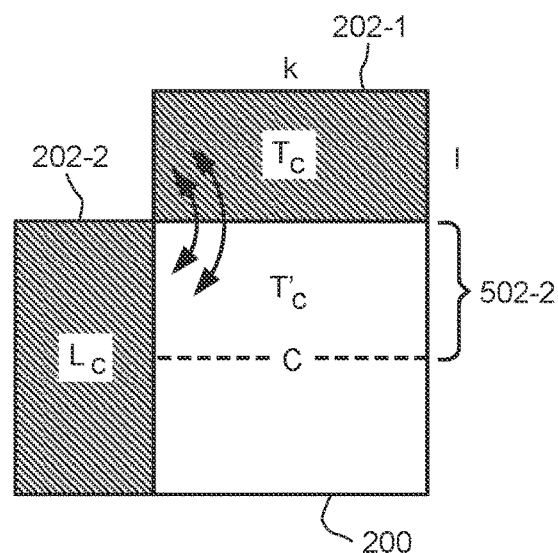

At 408 and in FIG. 5B, transcoder motion prediction block 108 then performs the same process with top template $T_C$ 202-1. For example, transcoder motion prediction block 108 finds a similar sized area in the current block C 200, such as region T'c 502-2. Then, transcoder motion prediction block 108 calculates the per-pixel distance between top template $T_C$ 202-1 and region T'c 502-2. Transcoder motion prediction block 108 may use the following to determine the distance, but other calculations may be appreciated:

$$Dist(T_c, T'_C) = \frac{\Sigma \|T_c(i, j) - T'_c(l - i, j)\|}{k \times l},$$

where (i, j) are pixel coordinates in top template $T_C$ 202-1, and (1-i, j) are corresponding pixel coordinates in region T'c 502-2. The calculation takes the difference of pixel values between the top template $T_C$ 202-1 and region T'c 502-2 and divides the sum by the area of top template $T_C$ 202-1. Transcoder motion prediction block 108 compares the difference between pixels in the same position in top template $T_C$ 202-1 and region T'c 502-2.

After determining region L'c 502-1 and region T'c 502-2, at 410, transcoder motion prediction block 108 calculates the weights $W_T$ and $W_L$ for top template $T_C$ 202-1 and left template $L_C$ 202-2, respectively. For example, transcoder motion prediction block 108 may use the following, but other calculations may be appreciated:

$$W_L = \frac{Dist(L_c, L'_C)}{Dist(T_c, T'_C) + Dist(L_c, L'_C)}, \text{ and}$$

$$W_T = \frac{Dist(T_c, T'_C)}{Dist(T_c, T'_C) + Dist(L_c, L'_C)}.$$

The above calculations determine the weighted distribution of the difference in distances between the templates and the similar sized regions. For example, the distance Dist($L_C$, L'c) is the difference between left template $L_C$ 202-2 and region L'c 502-1, and the distance Dist($T_c$, T'c) is the difference between top template $T_C$ 202-1 and region T'c 502-2. The weighted distribution calculates the contribution of each respective distance compared the total distance of distance Dist($L_C$, L'c) and distance Dist($T_c$, T'c).

At 412, transcoder motion prediction block 108 inserts information for weights $W_T$ and $W_L$ into the encoded bitstream. For example, transcoder motion prediction block 108 may convert the values of the weights $W_T$ and $W_L$ to integer values and insert the integers into the encoded bitstream. Transcoder motion prediction block 108 may use integers because integers are sent in the encoded bitstream instead of fractional numbers, but fractional numbers may also be used.

Figure 6:
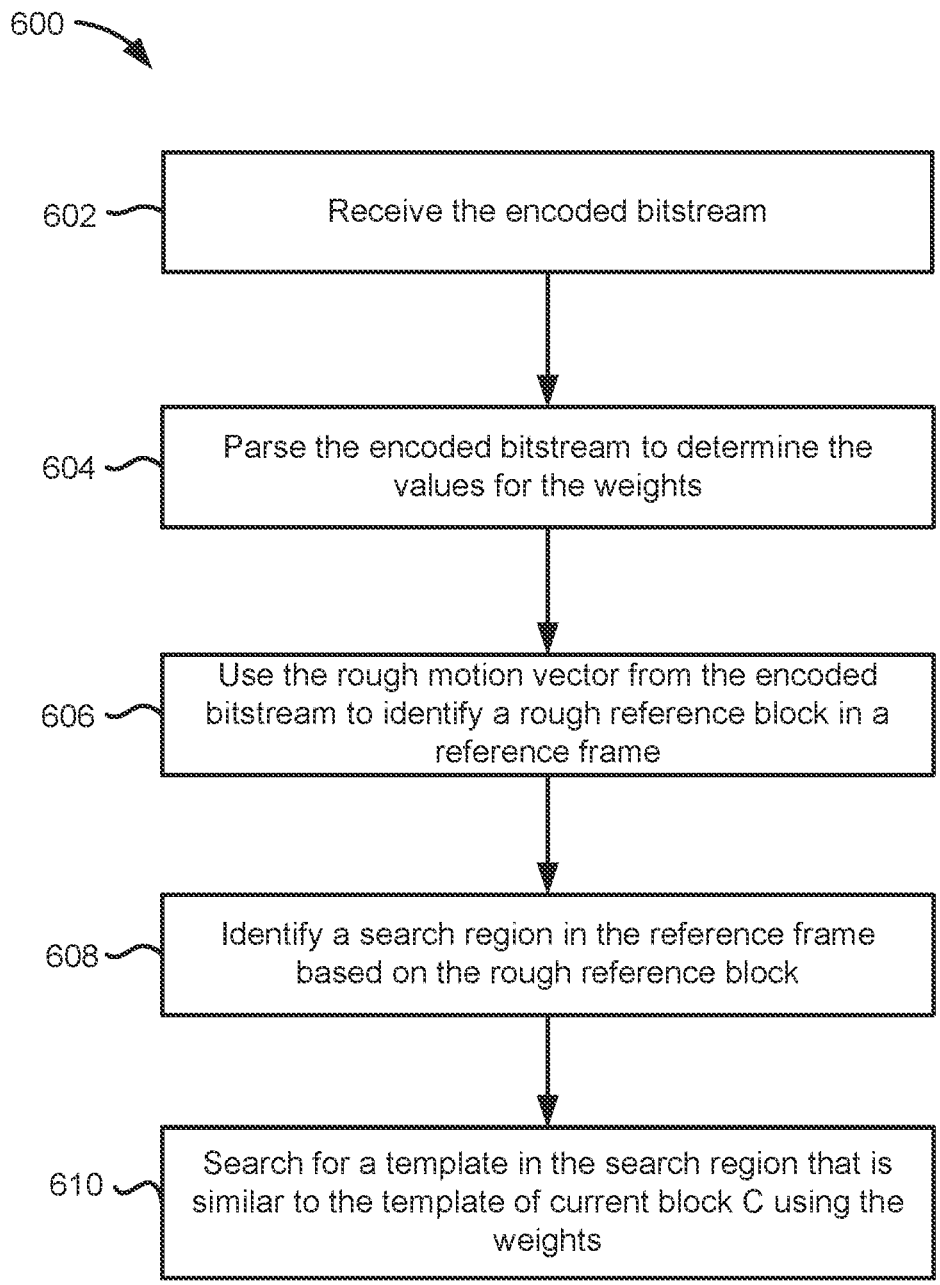
FIG. 6 depicts a simplified flowchart of a matching template search process at a decoder according to some embodiments.

The process then continues at decoder 112. FIG. 6 depicts a simplified flowchart 600 of a matching template search process at decoder 112 according to some embodiments. At 602, decoder motion prediction block 110 receives the encoded bitstream. At 604, when decoding a current block C 200, transcoder motion prediction block 108 parses the encoded bitstream to determine the values for the weights $W_T$ and $W_L$.

Figure 7:
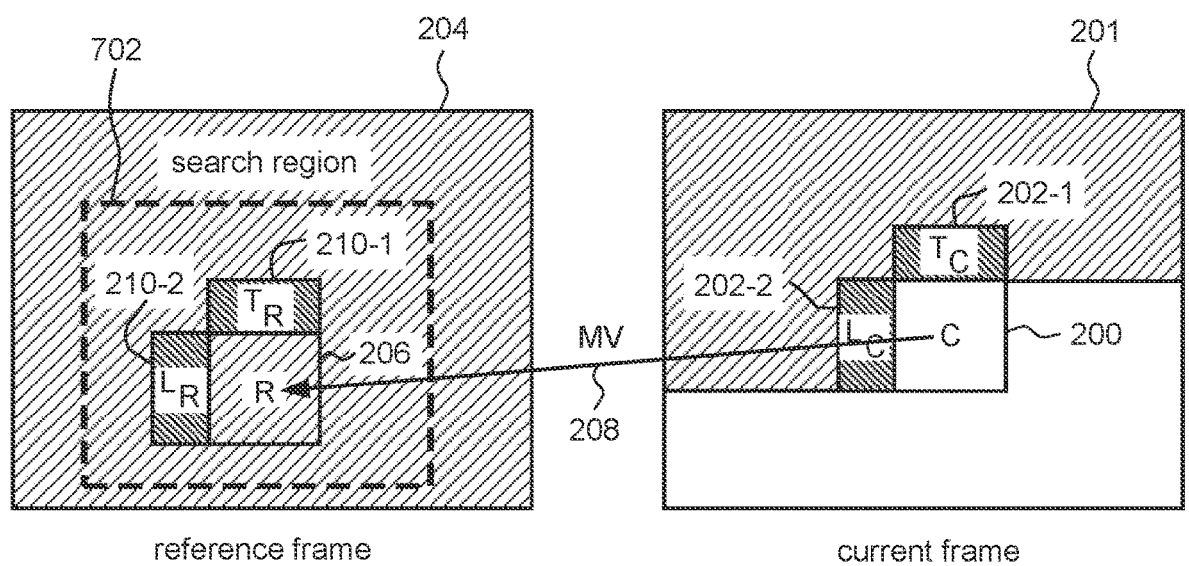
FIG. 7 depicts an example of a current frame and a reference frame in the matching template search process at the decoder according to some embodiments.

Decoder motion prediction block 110 then can use the weights in the matching template search process. FIG. 7 depicts an example of current frame 201 and reference frame 204 in the matching template search process at decoder 112 according to some embodiments. For example, at 606, decoder motion prediction block 110 uses the rough motion vector from the encoded bitstream to identify a rough reference block 206 in a reference frame 204. Although rough reference block 206 is identified, decoder motion prediction block 110 may look for a final reference block that may be a better match than the identified rough reference block 206 that was identified by rough motion vector 208.

To find a better match, at 608, decoder motion prediction block 110 identifies a search region 702 in reference frame 204 based on rough reference block 206. For example, decoder motion prediction block 110 determines a position of rough reference block 206 and then generates a boundary for search region 702 based on the position of rough reference block 206. The boundary may be a number of surrounding blocks to rough reference block 206, coordinates of a surrounding area to rough reference block 206, or other areas in reference frame 204.

After determining search region 702, at 610, decoder motion prediction block 110 searches for a template in search region 702 that is similar to the template of current block C 200 using the weights. For example, decoder motion prediction block 110 applies the respective weights to the left template and the top template for different reference blocks in search region 702 to select a final reference block that is most similar to current block C 200. Decoder motion prediction block 110 may find a different reference block using the weights compared to a process that does not use weights (e.g., an equal weighting is used). Because the template that is selected using the weights may be more similar to the content of current block C 200, then the final reference block selected using the weights may be more similar to the current block than a final reference block that is determined without using the weights.

In some examples, decoder motion prediction block 110 may select a final motion vector to a final reference block in search region 702. Then, decoder motion prediction block 110 applies the respective weights to pixel values of left template $L_R$ 210-2 and top template $T_R$ 210-1 of a prospective final reference block. Additionally, decoder motion prediction block 110 applies the respective weights to pixel values of left template $L_C$ 202-2 and top template $T_C$ 202-1 of current block C 200. Then, decoder motion prediction block 110 compares the weighted pixel values for the left templates and the weighted pixel values for the top templates to determine the similarity between the prospective final reference block and current block C 200. For example, a smaller distance between the weighted pixel values means more similarity. Decoder motion prediction block 110 may perform the above search for multiple prospective reference blocks in search region 702 and select a final reference block that includes a left template and a top template that is most similar to the left template and top template of current block C 200.

Second Option #2 of Determining the Weighting Factors

Figure 8:
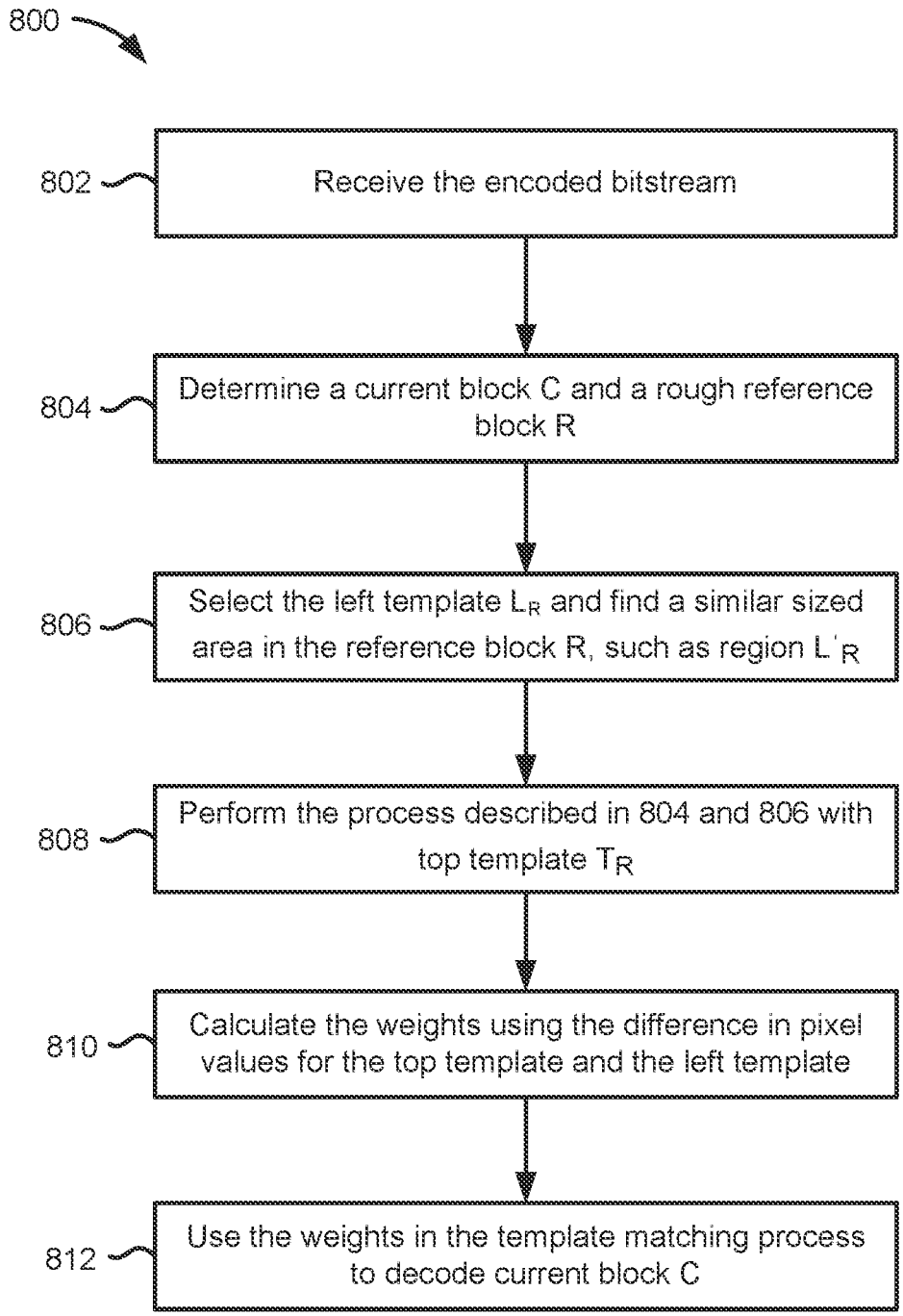
FIG. 8 depicts a simplified flowchart of a method for performing the matching template search process for a second option #2 according to some embodiments.
Figure 9:
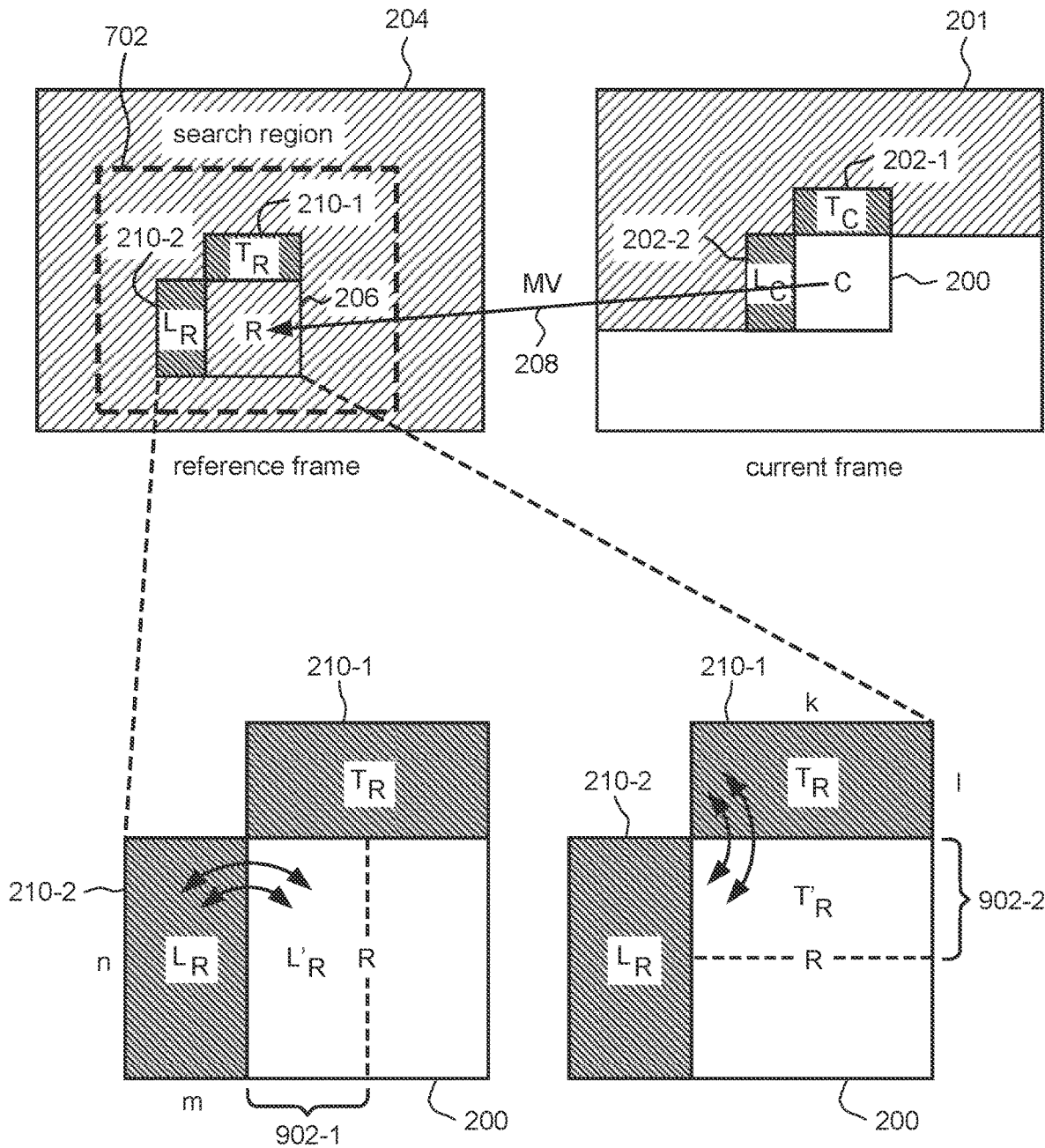
FIG. 9 depicts the frames used in the matching template search process for the second option #2 according to some embodiments.

The following will describe the matching template search process for the second option #2. FIG. 8 depicts a simplified flowchart 800 of a method for performing the matching template search process for second option #2 according to some embodiments. Also, FIG. 9 depicts the frames used in the matching template search process for second option #2 according to some embodiments. In this example, decoder motion prediction block 110 calculates the weights instead of transcoder motion prediction block 108.

At 802, decoder 112 receives the encoded bitstream. The encoded bitstream does not include the weights in some embodiments. In other embodiments, the encoded bitstream may include the weights, but decoder motion prediction block 110 may recalculate the weights.

During the decoding process, at 804, decoder motion prediction block 110 determines a current block C 200 and a rough reference block R 206. At 806, decoder motion prediction block 110 selects the left template $L_R$ and finds a similar sized area in rough reference block R 206, such as region $L'_R$ 902-1. Then, decoder motion prediction block 110 calculates the per-pixel distance of left template $L_R$ 210-2 and region $L'_R$ 902-1. For example, decoder motion prediction block 110 may use the following to determine the distance but other calculations may be appreciated:

$$Dist(L_R, L'_R) = \frac{\Sigma \|L_R(i, j) - L'_R(i, m - j)\|}{m \times n},$$

where (i, j) are pixel coordinates in left template $L_R$ 210-2, and (i, m-j) are corresponding pixel coordinates in region $L'_R$ 902-1. Decoder motion prediction block 110 calculates the difference of pixel values between left template $L_R$ 210-2 and region $L'_R$ 902-1 and divides the sum by the area of left template $L_R$ 210-2. Decoder motion prediction block 110 compares the difference between pixels in the same position in left template $L_R$ 210-2 and region $L'_R$ 902-1.

At 808, decoder motion prediction block 110 then performs the same process with top template $T_R$ 210-1. For example, decoder motion prediction block 110 selects a similar sized area in the current block R 200 as top template $T_R$ 210-1, such as region $T'_R$ 902-2. Then, decoder motion prediction block 110 calculates the per-pixel distance of template $T_R$ and region $T'_R$. Decoder motion prediction block 110 may use the following to determine the distance, but other calculations may be appreciated:

$$Dist(T_R, T'_R) = \frac{\Sigma \|T_R(i, j) - T'_R(l - i, j)\|}{k \times l},$$

where (i, j) are pixel coordinates in top template $T_R$ 210-1, and (1-i, j) are corresponding pixel coordinates in region $T'_R$ 902-2. Decoder motion prediction block 110 calculates the difference of pixel values between top template $T_R$ 210-1 and region $T'_R$ 902-2 and divides the sum by the area of top template $T_R$ 210-1. Decoder motion prediction block 110 compares the difference between pixels in the same position in top template $T_R$ 210-1 and region $T'_R$ 902-2.

At 810, decoder motion prediction block 110 then calculates the respective weights $W_T$ and $W_L$ using the difference in pixel values for top template $T_R$ 210-1 and region $T'_R$ 902-2 and left template $L_R$ 210-2 and region $L'_R$ 902-1. In the first option #1 above, transcoder motion prediction block 108 uses regions within current block C 200 because the current block is not encoded yet in the encoding process. However, in the decoding process, current block C 200 has not been decoded yet and regions within current block C 200 cannot be used to determine the weights. However, decoder motion prediction block 110 uses regions in the reference blocks, which have already been decoded.

In the calculation, decoder motion prediction block 110 may use the following, but other calculations may be appreciated:

$$W_L = \frac{Dist(L_R, L'_R)}{Dist(T_R, T'_R) + Dist(L_R, L'_R)}, \text{ and}$$

$$W_T = \frac{Dist(T_R, T'_R)}{Dist(T_R, T'_R) + Dist(L_R, L'_R)}.$$

The above calculations calculate the weighted distribution of the difference in distances between the templates and the similar sized regions. For example, the distance $Dist(L_R, L'_R)$ is the difference between left template $L_R$ 210-2 and region $L'_R$ 902-1, and the distance $Dist(T_R, T'_R)$ is the difference between top template $T_R$ 210-1 and region $T'_R$ 902-2. The weighted distribution calculates the contribution of each respective distance compared the total distance of distance $Dist(L_R, L'_R)$ and distance $Dist(T_R, T'_R)$.

At 812, decoder motion prediction block 110 uses the weights in the matching template search process to decode current block C 200. For example, decoder motion prediction block 110 can use a similar process as described above in option #1. In this case, decoder motion prediction block 110 determines the rough motion vector from the encoded bitstream for current block C 200, identifies a rough reference block 206 in reference frame 204, and searches for a final motion vector to a final reference block in search region 702 that may be a better match then the identified rough reference block using the weights. Decoder motion prediction block 110 may perform the above search for multiple reference blocks in search region 702 and select a final reference block that includes a left template and a top template that is most similar to the left template and top template of current block C 200.

Third Option #3 of Determining the Weighting Factors

In a third option #3, transcoder motion prediction block 108 or decoder motion prediction block 110 may select a single template to use. This process may use a "winner-take-all" strategy instead of the methodology of applying the weighting factors described above. The winner-take all strategy selects one of the templates to use instead of weighting the templates. In some embodiments, this may mean using a 100% weight for one template region and a 0% weight for the other template regions. Given the distance for left template $Dist_L$ and distance for top template $Dist_T$, transcoder motion prediction block 108 or decoder motion prediction block 110 determines if $Dist_L/Dist_T$<thresholdLow, which determines whether the distance of pixels of the left template from the rough reference block divided by the distance of pixels of the top template from the rough reference block is less than a threshold. As the distance of the top template becomes greater than the distance of the left template, the value of $Dist_L/Dist_T$ becomes smaller. The threshold thresholdLow is set at a value that indicates the distance of the top template has become greater than the distance of the left template by an amount that the left template is only used.

If the above threshold thresholdLow is not met, the decoder determines if $Dist_L/Dist_T$>thresholdHigh, which determines whether the distance of pixels of the left template from the rough reference block divided by the distance of pixels of the top template from the rough reference block is greater than a threshold. As the distance of the left template becomes greater compared to the distance of the top template, the value of $Dist_L/Dist_T$ becomes greater. The threshold thresholdHigh is set at a value that indicates the distance of the left template has become less than the distance of the top template by an amount that the top template is only used.

The third option #3 only uses one template to perform the search for a final reference block that may be most similar to the current block C 200. This option may be used when one template is not very similar to the final reference block or the current block.

Example Embodiments

In some embodiments, a method includes: receiving, by a computing device, an encoded bitstream, a first weight for a first template of pixels for a first block, and a second weight for a second template of pixels for the first block; determining, by the computing device, a second block that was signaled in the encoded bitstream as a reference for the first block; searching, by the computing device, for a third block to use as the reference for the first block, wherein searching comprises: determining a first template of pixels for the third block and a first template of pixels for the third block; applying the first weight to the first template of pixels for the first block to generate a weighted first template of pixels for the first block and applying the first weight to the first template of pixels for the third block to generate a weighted first template of pixels for the third block; applying the second weight to the second template of pixels for the first block to generate a weighted second template of pixels for the first block and applying the second weight to the second template of pixels for the third block to generate a weighted second template of pixels for the third block; and comparing the first weighted template of pixels for the first block to the first weighted template of pixels for the third block and comparing the second weighted template of pixels for the first block to the second weighted template of pixels for the third block to determine whether the third block is more similar to the first block than the second block.

In some embodiments, searching for the third block to use as the reference for the first block includes: applying the first weight to a first template of pixels for a plurality of third blocks to generate a weighted first template of pixels for the plurality of third blocks; applying the second weight to a second template of pixels for the plurality of third blocks to generate a weighted second template of pixels for the plurality of third blocks; comparing the first weighted template of pixels for the plurality of third blocks to the first weighted template of pixels for the first block and comparing the second weighted template of pixels for the plurality of third blocks to the second weighted template of pixels for the first block; and selecting one of the plurality of third blocks based on the comparing.

In some embodiments, the one of the plurality of third blocks is determined to be more similar to the first block than the second block.

In some embodiments, the first template of pixels for the first block includes pixels to a left of the first block, the second template of pixels for the first block includes pixels to a top of the first block, the first template of pixels for the third block includes pixels to the left of the third block, and the second template of pixels for the third block includes pixels to the top of the third block.

In some embodiments, a method includes: selecting, by a computing device, a first template of pixels that is outside of a first block and a second template of pixels that is outside of the first block; selecting, by the computing device, a first region of pixels that are inside the first block and a second region of pixels that are inside the first block; calculating, by the computing device, a first weight based on the first template of pixels and the first region of pixels; and calculating, by the computing device, a second weight based on the second template of pixels and the second region of pixels, wherein the first weight and the second weight are used in a motion prediction search for a second block.

In some embodiments, the first template of pixels includes pixels to a left of the first block, and the second template of pixels includes pixels to a top of the first block.

In some embodiments, the first template of pixels includes pixels that neighbor the pixels in the first region of pixels, and the second template of pixels includes pixels that neighbor the pixels in the second region of pixels.

In some embodiments, calculating the first weight includes calculating a first difference between pixels in the first template of pixels and the first region of pixels; and calculating the second weight includes calculating a second difference between pixels in the second template of pixels and the second region of pixels.

In some embodiments, calculating the first weight and the second weight includes calculating a weighted distribution of the first difference and the second difference.

In some embodiments, the method further includes: inserting the first weight and the second weight in an encoded bitstream.

In some embodiments, the first weight and the second weight are used to select the second block to use as a reference for decoding the first block.

In some embodiments, the first block is in a first frame of a video, and the second block is in a second frame of the video.

In some embodiments, the method further includes: searching for the second block to use as a reference for a third block being decoded using the first weight and the second weight.

In some embodiments, searching for the second block to use as the reference includes: determining a first template of pixels for the first block; determining a second template of pixels for the first block; applying the first weight to the first template of pixels for the second block to generate a weighted first template of pixels for the second block; and applying the second weight to the second template of pixels for the second block to generate a weighted second template of pixels for the second block.

In some embodiments, searching for the second block to use as the reference includes: applying the first weight to a first template of pixels for the third block to generate a weighted first template of pixels for the third block; applying the second weight to a second template of pixels for the third block to generate a weighted second template of pixels for the third block; and comparing the weighted first template of pixels for the second block to the weighted first template of pixels for the third block and comparing the weighted second template of pixels for the second block to the weighted second template of pixels for the third block to determine whether the second block is similar to the third block.

In some embodiments, searching for the second block to use as the reference includes: applying the first weight to a first template of pixels for a plurality of second blocks to generate a weighted first template of pixels for the plurality of second blocks; applying the second weight to a second template of pixels for the plurality of second blocks to generate a weighted second template of pixels for the plurality of second blocks; applying the first weight to a first template of pixels for the third block to generate a weighted first template of pixels for the third block; applying the second weight to a second template of pixels for the third block to generate a weighted second template of pixels for the third block; comparing the weighted first template of pixels for the plurality of second blocks to the weighted first template of pixels for the third block and comparing the weighted second template of pixels for the plurality of second blocks to the weighted second template of pixels for the third block; and selecting one of the plurality of second blocks based on the comparing.

In some embodiments, the plurality of second blocks are included in a search area in a frame.

In some embodiments, the third block is being decoded, the first block is signaled as a reference block in an encoded bitstream, and the second block is searched for as a new reference block to use to decode the third block.

In some embodiments, the third block is in a first frame, and the first block and the second block are in a second frame.

Figure 10:
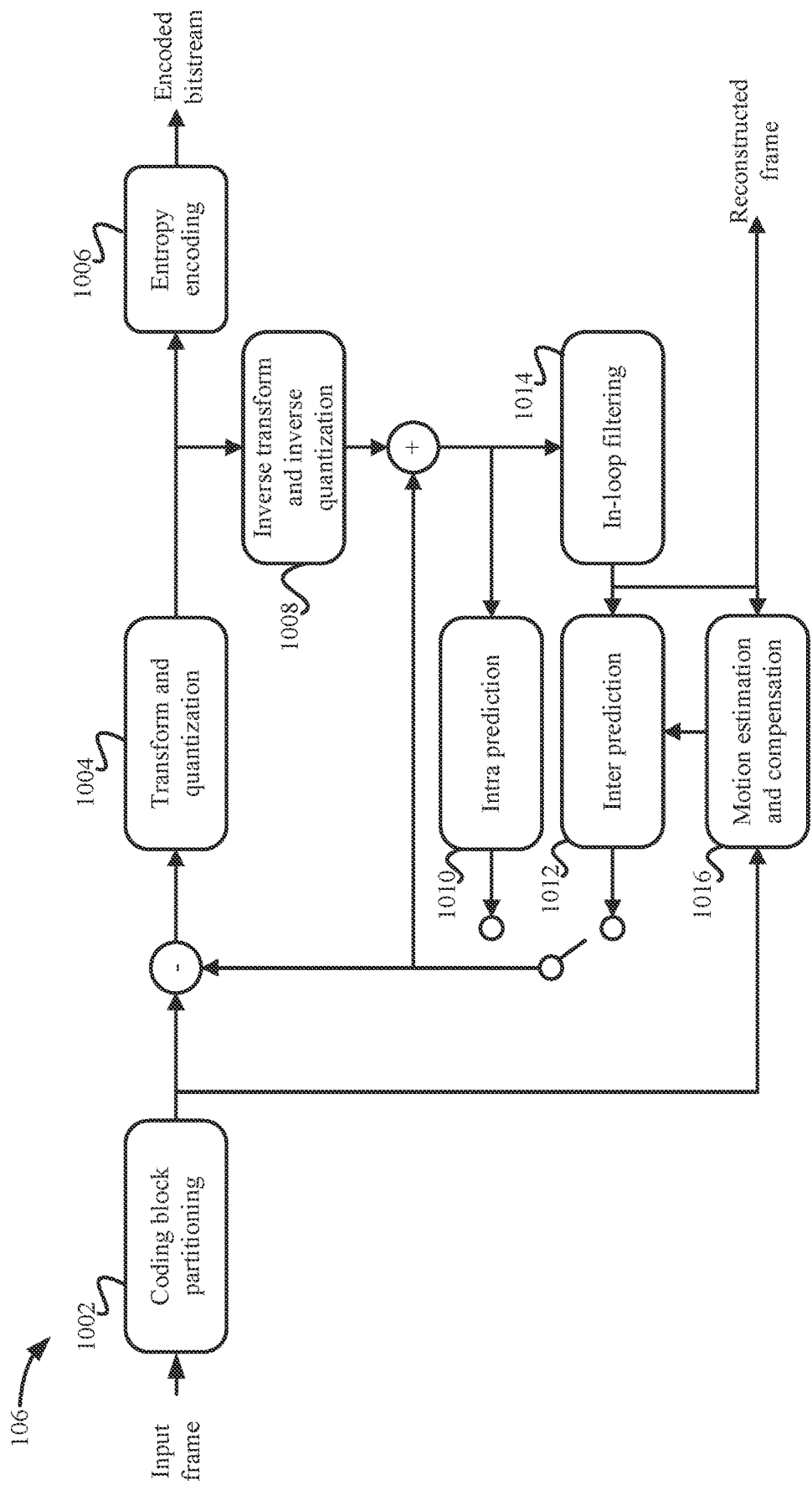
FIG. 10 depicts an example of a transcoding system according to some embodiments.

In some embodiments, a non-transitory computer-readable storage medium contains instructions, that when executed, control a computer system to be operable for: selecting a first template of pixels that is outside of a first block and a second template of pixels that is outside of the first block; selecting a first region of pixels that are inside the first block and a second region of pixels that are inside the first block; calculating a first weight based on the first template of pixels and the first region of pixels; and calculating a second weight based on the second template of pixels and the second region of pixels, wherein the first weight and the second weight are used in a motion prediction search for a second block System FIG. 10 depicts an example of a transcoding system according to some embodiments. A video codec framework includes a set of fundamental components: block partitioning, inter and intra prediction, transform and quantization, and entropy coding.

Transcoder 106 receives a frame of a video, which is firstly split into non-overlapping coding blocks for further processing. To cope with different video content characteristics, complex regions will be covered by partitions with smaller sizes, while simple regions will be covered by larger partitions. Multiple block patterns and shapes are may be both used together, for example quad-tree pattern, triple-tree pattern and binary-tree pattern can be all used together, while square blocks and rectangular blocks can also be used together.

Prediction is used to remove the redundancy of a video signal. By subtracting the predicted pixel values from the pixels being processed, the amplitude of a residual signal can be significantly reduced, thus the resulting bitstream size can be reduced. An intra prediction block 1010, which is using reference pixels in the current frame, aims to reduce the spatial redundancy within the frame. An inter prediction block 1012, which is using reference pixels from neighboring frames, attempts to remove the temporal redundancy between frames. a motion estimation and compensation block 1016 may be a sub-module of inter prediction at the transcoder side, which captures the motion trace of objects among adjacent frames and generates reference pixels for inter prediction.

A transform and quantization block 1004 uses the residual pixels after intra or inter prediction. Transform and quantization block 1004 performs a transform operation that represents the residual signal in a frequency domain. Considering the human visual system is more sensitive on low frequency components of video signal than the high frequency components, quantization is designed to further compress the residual signal by reducing the precision on high frequency signals.

To avoid the out-of-sync issue between transcoder 106 and decoder 112, transcoder 106 contains decoding modules to make sure both transcoder 106 and decoder 112 are using identical mathematical processes. Thus, an inverse transform and inverse quantization block 1008 is similar to the same block on the decoder side. Inverse transform and inverse quantization block 1008 reconstructs pixels using the intra and inter prediction.

An in-loop filter 1014 removes any visual artifacts that are introduced by the above-mentioned processes. Various filtering methods are applied on the reconstructed frame in a cascaded way to reduce different artifacts, including but not limited to the blocking artifacts, mosquito artifacts, color banding effects, etc.

An entropy encoding block 1006 may further compress the bitstream using a model-based method. Transcoder 106 transmits the resulting encoded bitstream to decoder 112 over a network or other types of medium.

Figure 11:
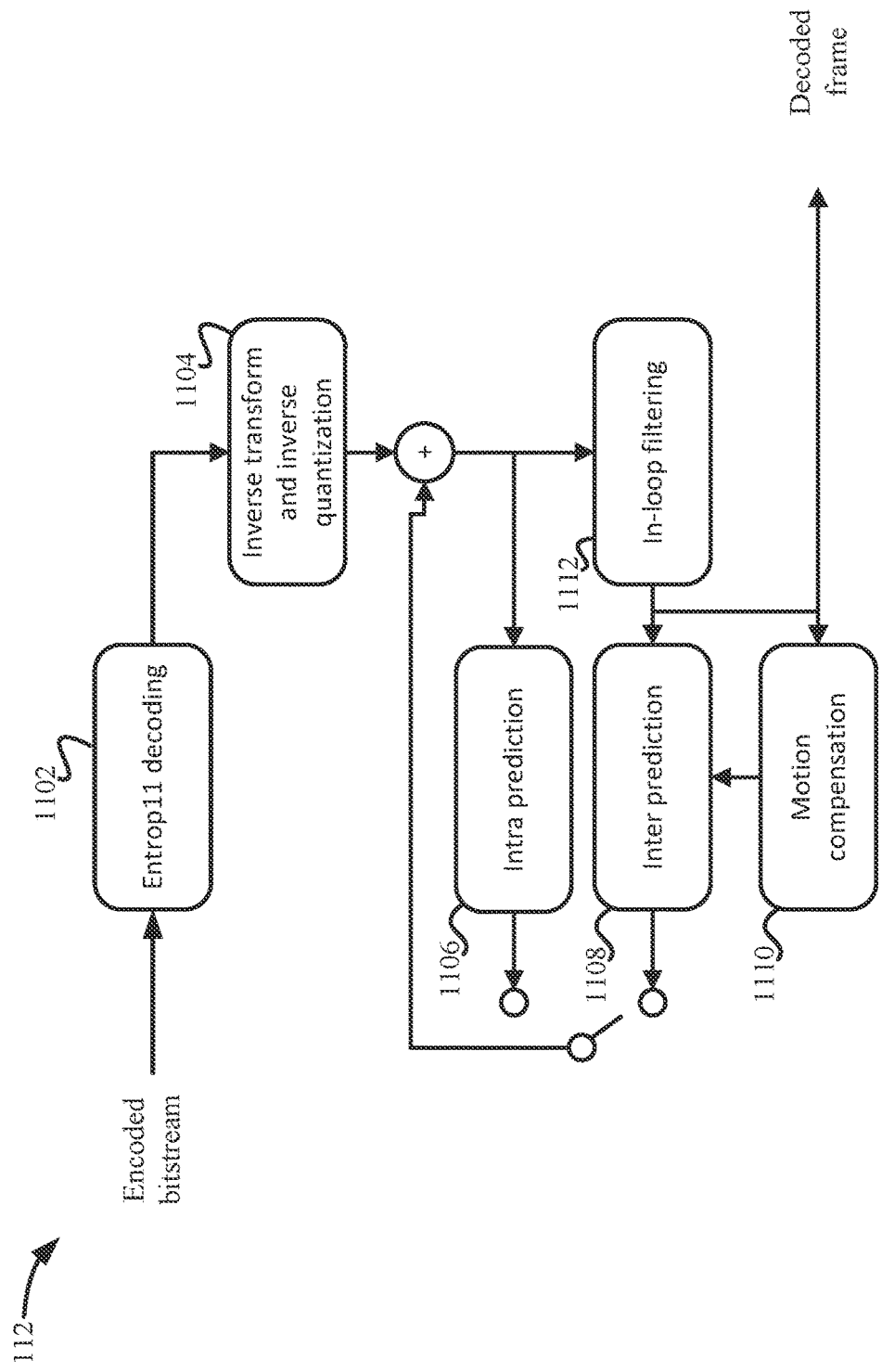
FIG. 11 depicts an example of a decoding system according to some embodiments.

FIG. 11 depicts an example of a decoding system according to some embodiments. Decoder 112 receives the encoded bitstream and inputs it into an entropy decoding block 1102 to recover the information needed for decoding process. As above-mentioned, a decoded frame can be decoded by using an inverse transform and inverse quantization block 1104, an intra prediction block 1106 or inter prediction block 1108, motion compensation block 1110, and in-loop filtering block 1112 in the same way to build a decoded frame.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
  receiving an encoded bitstream for a first block, wherein a second block is signaled in the encoded bitstream as a reference for the first block;
  searching for a third block to use as the reference for the first block, wherein searching comprises:
    applying a first weight to a first template of pixels for the first block to generate a weighted first template of pixels for the first block and applying the first weight to a first template of pixels for the third block to generate a weighted first template of pixels for the third block;

applying a second weight to a second template of pixels for the first block to generate a weighted second template of pixels for the first block and applying the second weight to a second template of pixels for the third block to generate a weighted second template of pixels for the third block; and comparing the first weighted template of pixels for the first block to the first weighted template of pixels for the third block and comparing the second weighted template of pixels for the first block to the second weighted template of pixels for the third block to determine whether the third block is more similar to the first block than the second block.

2. The method of claim 1, wherein searching for the third block to use as the reference for the first block comprises:

applying the first weight to a first template of pixels for a plurality of third blocks to generate a weighted first template of pixels for respective third blocks in the plurality of third blocks;

applying the second weight to a second template of pixels for the plurality of third blocks to generate a weighted second template of pixels for respective third blocks in the plurality of third blocks;

comparing the first weighted template of pixels for respective third blocks in the plurality of third blocks to the first weighted template of pixels for the first block and comparing the second weighted template of pixels for respective third blocks in the plurality of third blocks to the second weighted template of pixels for the first block; and selecting one of the plurality of third blocks based on the comparing.

3. The method of claim 2, wherein:
the one of the plurality of third blocks is determined to be more similar to the first block than the second block.

4. The method of claim 1, wherein:
the first template of pixels for the first block includes pixels to a left of the first block,
the second template of pixels for the first block includes pixels to a top of the first block,
the first template of pixels for the third block includes pixels to the left of the third block, and
the second template of pixels for the third block includes pixels to the top of the third block.

5. The method of claim 1, wherein:
the first weight is determined by:
selecting a first region of pixels that is inside the first block, wherein the first template of pixels for the first block and first region of pixels are similar sizes of a height and a width;
calculating the first weight based on the first template of pixels for the first block and the first region of pixels; and
the second weight is determined by:
selecting a second region of pixels that is inside the first block, wherein the second template of pixels for the first block and the second region of pixels are similar sizes of a height and a width
calculating the second weight based on the second template of pixels for the first block and the second region of pixels.

6. The method of claim 5, wherein:
the first template of pixels for the first block includes pixels that neighbor the pixels in the first region of pixels, and
the second template of pixels for the first block includes pixels that neighbor the pixels in the second region of pixels.

7. The method of claim 5, wherein:
calculating the first weight comprises calculating a first difference between pixels in the first template of pixels for the first block and the first region of pixels; and
calculating the second weight comprises calculating a second difference between pixels in the second template of pixels for the first block and the second region of pixels.

8. The method of claim 7, wherein:
calculating the first weight and the second weight comprises calculating a weighted distribution of the first difference and the second difference.

9. The method of claim 1, wherein the first weight and the second weight are included in the encoded bitstream.

10. The method of claim 1, wherein the first weight and the second weight are calculated and not included in the encoded bitstream.

11. The method of claim 1, wherein:
the first weight and the second weight are used to select the third block to use as the reference for decoding the first block.

12. The method of claim 1, wherein:
the first block is in a first frame of a video, and
the second block is in a second frame of the video.

13. The method of claim 1, further comprising:
searching a search area for the third block to use as the reference for the first block being decoded.

14. The method of claim 1, wherein:
the first block, the first template of pixels for the first block, and the second template of pixels for the first block are in a same frame,
the third block, the first template of pixels for the third block, and the second template of pixels for the third block are in another frame.

15. The method of claim 1, wherein:
the first weight and the second weight are different values,
values of the first weight and the second weight are determined based on:
a first difference between pixels in the first template of pixels for the first block and a first region of pixels inside the first block; and
a second difference between pixels in the second template of pixels for the first block and a second region of pixels inside the first block.

16. The method of claim 15, wherein:
the first template of pixels for the first block and first region of pixels are similar sizes of a height and a width, and
the second template of pixels for the first block and second region of pixels are similar sizes of a height and a width.

17. The method of claim 1, wherein:
the first block is being decoded, and
the third block is searched for as a new reference block to use to decode the first block.

18. The method of claim 1, wherein:
the first template of pixels for the first block and first template of pixels for the third block are similar sizes of a height and a width, and the second template of pixels for the first block and second template of pixels for the third block are similar sizes of a height and a width.

19. A non-transitory computer-readable storage medium containing instructions, that when executed, control a computer system to be operable for:
receiving an encoded bitstream for a first block, wherein a second block is signaled in the encoded bitstream as a reference for the first block;
searching for a third block to use as the reference for the first block, wherein searching comprises:
applying a first weight to a first template of pixels for the first block to generate a weighted first template of pixels for the first block and applying the first weight to a first template of pixels for the third block to generate a weighted first template of pixels for the third block;
applying a second weight to a second template of pixels for the first block to generate a weighted second template of pixels for the first block and applying the second weight to a second template of pixels for the third block to generate a weighted second template of pixels for the third block; and
comparing the first weighted template of pixels for the first block to the first weighted template of pixels for the third block and comparing the second weighted template of pixels for the first block to the second weighted template of pixels for the third block to determine whether the third block is more similar to the first block than the second block.

20. An apparatus comprising:
one or more computer processors; and
a computer-readable storage medium comprising instructions for controlling the one or more computer processors to be operable for:
receiving an encoded bitstream for a first block, wherein a second block is signaled in the encoded bitstream as a reference for the first block;
searching for a third block to use as the reference for the first block, wherein searching comprises:
applying a first weight to a first template of pixels for the first block to generate a weighted first template of pixels for the first block and applying the first weight to a first template of pixels for the third block to generate a weighted first template of pixels for the third block;
applying a second weight to a second template of pixels for the first block to generate a weighted second template of pixels for the first block and applying the second weight to a second template of pixels for the third block to generate a weighted second template of pixels for the third block; and
comparing the first weighted template of pixels for the first block to the first weighted template of pixels for the third block and comparing the second weighted template of pixels for the first block to the second weighted template of pixels for the third block to determine whether the third block is more similar to the first block than the second block.

* * * * *